US011416313B2

(12) United States Patent
Luo et al.

(10) Patent No.: US 11,416,313 B2
(45) Date of Patent: Aug. 16, 2022

(54) EQUIPMENT CONTROL METHOD, CLUSTER SYSTEM, ELECTRONIC DEVICE AND READABLE STORAGE MEDIUM

(71) Applicants: Beijing Kingsoft Cloud Network Technology Co., Ltd., Beijing (CN); Beijing Kingsoft Cloud Technology Co., Ltd., Beijing (CN); Beijing Jinxun Ruibo Network Technology Co., Ltd, Beijing (CN)

(72) Inventors: Jun Luo, Beijing (CN); Tao Jia, Beijing (CN)

(73) Assignees: Beijing Kingsoft Cloud Network Technology Co., Ltd., Beijing (CN); Beijing Kingsoft Cloud Technology Co., Ltd., Beijing (CN); Beijing Jinxun Ruibo Network Technology Co., Ltd., Beijing (CN)

( * ) Notice: Subject to any disclaimer, the term of this patent is extended or adjusted under 35 U.S.C. 154(b) by 97 days.

(21) Appl. No.: 16/959,728

(22) PCT Filed: Sep. 20, 2018

(86) PCT No.: PCT/CN2018/106743
§ 371 (c)(1),
(2) Date: Jul. 2, 2020

(87) PCT Pub. No.: WO2019/134402
PCT Pub. Date: Jul. 11, 2019

(65) Prior Publication Data
US 2020/0364095 A1 Nov. 19, 2020

(30) Foreign Application Priority Data

Jan. 5, 2018 (CN) .......................... 201810012150.2

(51) Int. Cl.
G06F 9/52 (2006.01)
H04L 41/0806 (2022.01)
H04L 67/1097 (2022.01)

(52) U.S. Cl.
CPC .............. *G06F 9/524* (2013.01); *G06F 9/526* (2013.01); *H04L 41/0806* (2013.01); *H04L 67/1097* (2013.01)

(58) Field of Classification Search
CPC ..... G06F 9/524; G06F 9/526; H04L 41/0806; H04L 67/1097
See application file for complete search history.

(56) References Cited

U.S. PATENT DOCUMENTS 5,933,824 A * 8/1999 DeKoning ................ G06F 9/52
710/200
7,398,323 B1 * 7/2008 Gerraty ............... H04L 41/0803
709/242

(Continued)

FOREIGN PATENT DOCUMENTS

CN 102904833 A 1/2013
CN 104063355 A * 9/2014 ........... G06F 15/167

(Continued)

OTHER PUBLICATIONS

Jul. 1, 2021, First Office Action of the corresponding Indian Patent Application No. 202017030654.

(Continued)

*Primary Examiner* — Shean Tokuta
(74) *Attorney, Agent, or Firm* — Clements Bernard Baratta; Lawrence A. Baratta, Jr.

(57) ABSTRACT

The present application provides a method, a cluster system, an electronic device for operating a device, and a readable storage medium, involving the technical field of clusters. Sequential data operations on the communication device is implemented through the cooperation between the first clus- (Continued)

ter and the second cluster. The first nodes in the first cluster compete for the first distributed lock to implement sequential storage of the data operation requests. The second nodes in the second cluster compete for the second distributed lock to obtain the stored data operation requests sequentially, and complete the data operations on the target communication device.

20 Claims, 5 Drawing Sheets

(56) References Cited

U.S. PATENT DOCUMENTS

| | | | |
|---|---|---|---|
| 8,266,111 | B2 | 9/2012 | Lin et al. |
| 10,397,053 | B2* | 8/2019 | Sridhara ............. H04L 67/1097 |
| 10,705,956 | B1* | 7/2020 | Brenneman ......... G06F 12/0804 |
| 2009/0019098 | A1 | 1/2009 | Gunda et al. |
| 2014/0156959 | A1* | 6/2014 | Heidelberger .......... G06F 5/065 |
| | | | 711/170 |
| 2014/0258255 | A1* | 9/2014 | Merriman ............... G06F 16/27 |
| | | | 707/704 |
| 2015/0350318 | A1* | 12/2015 | Van Assche ........ H04L 67/1095 |
| | | | 709/202 |
| 2016/0043897 | A1* | 2/2016 | Xing ..................... G06F 15/167 |
| | | | 709/223 |
| 2017/0293747 | A1* | 10/2017 | Naqvi ................... G06F 21/316 |
| 2018/0218024 | A1* | 8/2018 | Mettu ................... G06F 16/2343 |
| 2020/0364095 | A1* | 11/2020 | Luo ..................... H04L 67/1097 |
| 2021/0349863 | A1* | 11/2021 | Dani ................... G06F 16/2379 |

FOREIGN PATENT DOCUMENTS

| | | | | |
|---|---|---|---|---|
| CN | 104092767 | A | | 10/2014 |
| CN | 105072160 | A | | 11/2015 |
| CN | 105760519 | A | | 7/2016 |
| CN | 106210038 | A | | 12/2016 |
| CN | 106354565 | A | | 1/2017 |
| CN | 106537364 | A | | 3/2017 |
| CN | 106909599 | A | | 6/2017 |
| CN | 107092521 | A | | 8/2017 |
| CN | 107111596 | A | | 8/2017 |
| CN | 107204861 | A | | 9/2017 |
| CN | 104461705 | B | * | 2/2019 |
| RU | 2413984 | C2 | | 3/2011 |
| RU | 2585973 | C2 | | 6/2016 |
| WO | WO-2005124554 | A2 | * | 12/2005 ........... H04L 41/028 |
| WO | 2015096606 | A1 | | 7/2015 |
| WO | 2017100978 | A1 | | 6/2017 |
| WO | WO-2019134402 | A1 | * | 7/2019 ............... G06F 9/52 |

OTHER PUBLICATIONS

Jul. 14, 2021, Second Office Action of the priority Chinese Patent Application No. 201810012150.2.
Dec. 7, 2018, International Search Report issued for International Application No. PCT/CN2018/106743.
First Office Action issued for Russian Patent Application No. 2020125088 dated Jan. 14, 2021.
Supplementary Search Report of the priority CN Application No. 201810012150.2 dated Mar. 17, 2022.

* cited by examiner

_(1)_

EQUIPMENT CONTROL METHOD, CLUSTER SYSTEM, ELECTRONIC DEVICE AND READABLE STORAGE MEDIUM

The present application claims the priority to a Chinese patent application No. 201810012150.2, filed with the China National Intellectual Property Administration on Jan. 5, 2018 and entitled "Equipment Control Method, Cluster System, Electronic Device and Readable Storage Medium", which is incorporated herein by reference in its entirety.

TECHNICAL FIELD

The present application relates to the technical field of cluster systems, and specifically to a method, a cluster system, an electronic device for operating a device, and a readable storage medium.

BACKGROUND

In distributed systems or other systems, there may be a case in which requests with high concurrency need to be processed. In this case, such requests need to be issued and processed sequentially. In the high concurrency state, due to the large number of concurrent requests, the processing for the requests would be disordered.

SUMMARY

In view of this, the present application provides a method, a cluster system, an electronic device for operating a device, and a readable storage medium, which can implement sequential processing for the requests.

The technical solutions of the present application are as follows.

A method for operating a device, which is applicable to a cluster system, wherein the cluster system includes a first cluster and a second cluster, the first cluster includes a plurality of first nodes, the second cluster includes a plurality of second nodes, and the method for operating a device includes:

obtaining, by at least two first nodes in the first cluster respectively, at least two data operation requests for a target communication device;

performing competition, between the at least two first nodes, for a first distributed lock that is preset for the target communication device;

storing the obtained data operation request by a first node that obtains the first distributed lock through competition;

performing competition, between the second nodes in the second cluster, for a second distributed lock preset for the target communication device;

obtaining, by a second node that obtains the second distributed lock through competition, a data operation request from stored data operation requests according to storage time information of the stored data operation requests, so as to perform a data operation on the target communication device.

In an implementation, the data operation requests comprise identification information of the target communication device, and performing competition, between the at least two first nodes, for a first distributed lock preset for the target communication device includes:

determining, by the at least two first nodes, a first distributed lock corresponding to the target communication device according to the identification information of the target communication device, and performing competition for the first distributed lock.

In an implementation, after storing the obtained data operation request by the first node that obtains the first distributed lock through competition, the method further includes:

releasing the first distributed lock by the first node that obtains the first distributed lock through competition, such that other first nodes obtaining data operation requests start to compete for the first distributed lock.

In an implementation, obtaining, by a second node that obtains the second distributed lock through competition, a data operation request from stored data operation requests according to storage time information of the stored data operation requests includes:

obtaining, by the second node that obtains the second distributed lock through competition, a data operation request with the earliest storage time from the stored data operation requests.

In an implementation, after performing the data operation on the target communication device by the second node that obtains the second distributed lock through competition, the method further includes:

releasing, by the second node that obtains the second distributed lock through competition, the second distributed lock, and deleting, from the stored data operation requests, the data operation request obtained by the second node that obtains the second distributed lock through competition.

In an implementation, after storing the obtained data operation request by the first node that obtains the first distributed lock through competition, the method further includes:

generating and sending, by the first node that obtains the first distributed lock through competition, a notification message to the second cluster to instruct the second nodes in the second cluster to perform data operations on the target communication device.

In an implementation, the target communication device is a switch, and the data operation request is a configuration request for configuring the switch.

In an implementation, storing the obtained data operation request by a first node that obtains the first distributed lock through competition includes:

storing the data operation request in a manner of increasing ID automatically;

wherein obtaining, by a second node that obtains the second distributed lock through competition, a data operation request from stored data operation requests according to storage time information of the stored data operation requests includes:

obtaining a data operation request with the smallest ID from the stored data operation requests.

The present application further provides a cluster system, which includes a first cluster and a second cluster, and the first cluster includes a plurality of first nodes, and the second cluster includes a plurality of second nodes, wherein, at least two first nodes in the first cluster respectively obtain at least two data operation requests for a target communication device;

the at least two first nodes compete for a first distributed lock that is preset for the target communication device;

a first node that obtains the first distributed lock through competition stores the obtained data operation request;

the second nodes in the second cluster compete for a second distributed lock that is preset for the target communication device;

a second node that obtains the second distributed lock through competition obtains a data operation request from stored data operation requests according to storage time information of the stored data operation requests, so as to perform a data operation on the target communication device.

In an implementation, the data operation requests include identification information of the target communication device, and the at least two first nodes are configured for:

determining a first distributed lock corresponding to the target communication device according to the identification information of the target communication device, and competing for the first distributed lock.

In an implementation, the first node that obtains the first distributed lock through competition is configured for releasing the first distributed lock after storing the obtained data operation request, such that other first nodes obtaining data operation requests start to compete for the first distributed lock.

In an implementation, the second node that obtains the second distributed lock through competition is configured for:

obtaining a data operation request with the earliest storage time from the stored data operation requests.

In an implementation, the second node that obtains the second distributed lock through competition is configured for releasing the second distributed lock after performing the data operation on the target communication device, and deleting, from the stored data operation requests, the data operation request obtained by the second node that obtains the second distributed lock through competition.

In an implementation, the first node that obtains the first distributed lock through competition is configured for, after storing the obtained data operation request, generating and sending a notification message to the second cluster to instruct the second nodes in the second cluster to perform data operations on the target communication device.

In an implementation, the target communication device is a switch, and the data operation request is a configuration request for configuring the switch.

In an implementation, the first node that obtains the first distributed lock through competition is configured for:

storing the data operation request in a manner of increasing ID automatically;

wherein the second node that obtains the second distributed lock through competition is configured for:

obtaining a data operation request with the smallest ID from the stored data operation requests.

An embodiment of the present application further provides a readable storage medium, wherein the readable storage medium stores first instructions, when the first instructions are executed on a computer, the computer carries out steps performed by the first node in the above method for operating a device; and/or, the readable storage medium stores second instructions, when the second instructions are executed on a computer, the computer carries out steps performed by the second node in the above method for operating a device.

An embodiment of the present application further provides an electronic device, which includes a memory and a processor, wherein the memory is configured for storing first executable program code, and the processor is configured for reading the first executable program code stored in the memory to carry out steps performed by the first node in the above method for operating a device; and/or the memory is configured for storing second executable program code, and the processor is configured for reading the second executable program code stored in the memory to carry out steps performed by the second node in the above method for operating a device.

The embodiments of the present application provide a method, a cluster system, an electronic device for operating a device and a readable storage medium, wherein the data operations on the communication device is implemented through the cooperation between the first cluster and the second cluster in the cluster system. The first nodes in the first cluster may compete for the first distributed lock to implement sequential storage of the data operation requests. The second nodes in the second cluster may compete for the second distributed lock to obtain the stored data operation requests sequentially, and complete the data operations on the target communication device. Through the mechanism of two distributed locks, when a high concurrency state in which a large number of data operation requests are received occurs in the cluster system, the sequential processing for the large number of data operation requests still can be implemented through the mutual exclusion nature of the first distributed lock and second distributed lock. It can not only ensure the sequential processing for the data operation requests, but also improve the throughput of the first cluster, and both the first cluster and the second cluster can be expanded horizontally, which improves availability and processing capacity of the system.

In order to make the above objects, features, and advantages of the present application more apparent and comprehensible, preferred embodiments are described in detail below in conjunction with the accompanying drawings.

BRIEF DESCRIPTION OF THE DRAWINGS

In order to more clearly describe the technical solution of the embodiments of the present application, drawings needed in the embodiments will be briefly described below. It should be appreciated that, the drawings described below are for only some embodiments of the present application, which should not be understood as a limitation on the scope, one of ordinary skills in the art can also obtain other related drawings based on these drawings without any creative efforts.

Figure 1:
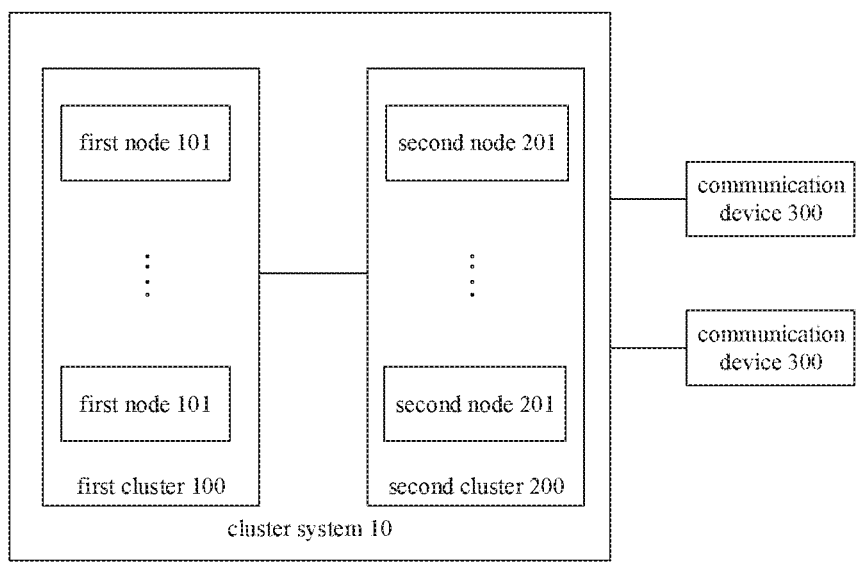
FIG. 1 is a schematic composition diagram of a cluster system according to an embodiment of the present application.

List of reference signs: 10—cluster system; 100—first cluster; 101—first node; 200—second cluster; 201—second node; 300—communication device; 400—storage space; 500—electronic device; 501—processor; 502—memory.

DETAILED DESCRIPTION

The technical solution of embodiments of the present application will be described clearly and completely below in combination with the drawings of the embodiments of the present application. Obviously, the embodiments described are only some of the embodiments of the present application instead of all of them. Components of the embodiments of the present application, which are generally described and illustrated in the drawings herein, may be arranged and designed in various different configurations. Therefore, the following detailed description of the embodiments of the present application illustrated in the drawings is not intended to limit the scope of the claimed application, but merely represents selected embodiments of the present application. All other embodiments obtained by those skilled in the art based on the embodiments herein without any creative efforts are within the scope of the present application.

It should be noted that similar reference signs and letters indicate similar items in the following drawings, thus once an item is defined in one drawing, this item is not required to be further defined and explained in subsequent drawings. Meanwhile, in the description of the present application, terms such as "first", "second" and the like are only used to implement distinguishable description, which cannot be understood to indicate or imply relative importance.

Figure 2:
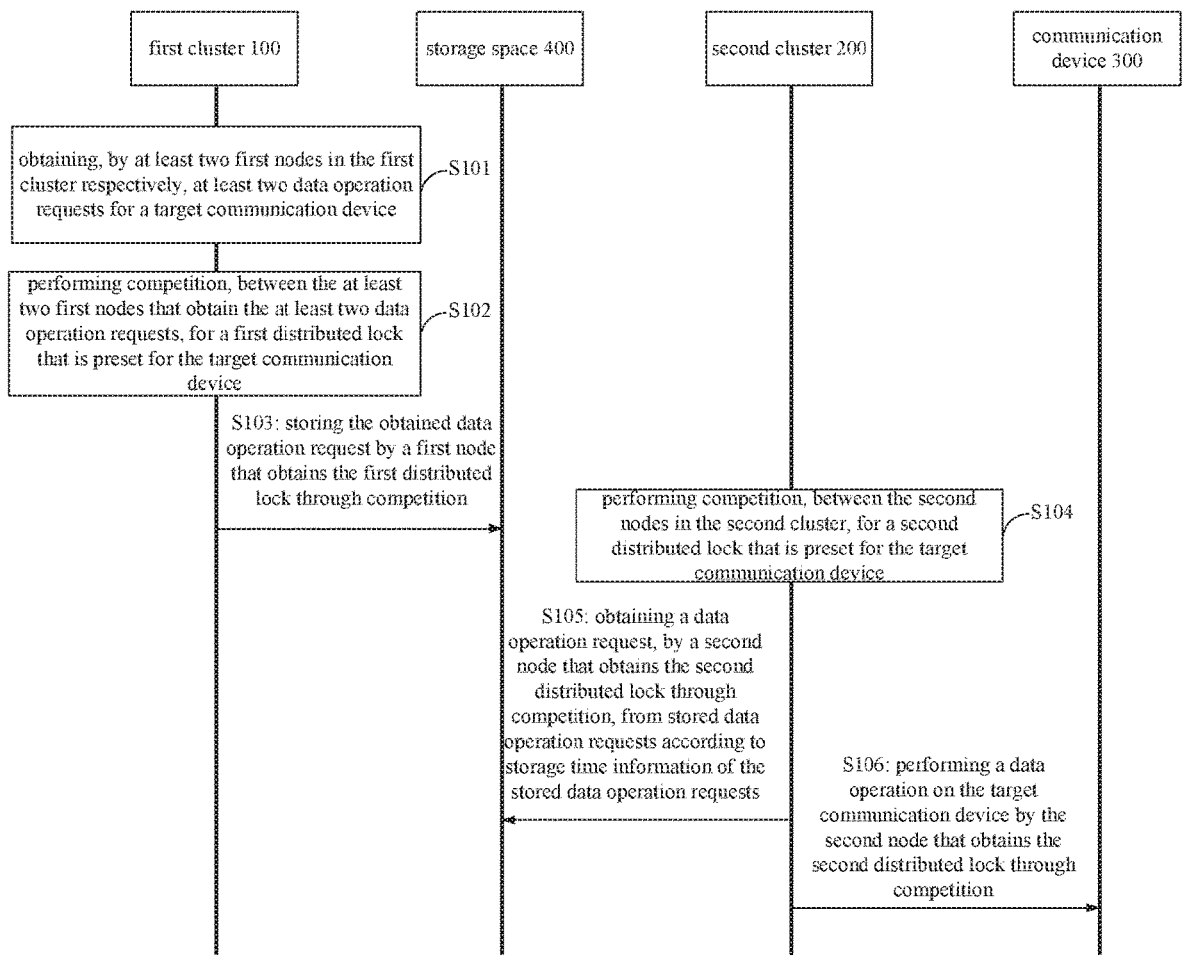
FIG. 2 is a sequence diagram of a method for operating a device according to an embodiment of the present application.

Some embodiments of the present application provide a method for operating a device, as shown in FIG. 1, which is applicable to a cluster system 10. The cluster system 10 includes a first cluster 100 composed of a plurality of first nodes 101 and a second cluster 200 composed of a plurality of second nodes 201. The cluster system 10 has a communication connection with at least one communication device 300. As shown in FIG. 2, the method for operating a device includes following steps.

Step S101: obtaining, by at least two first nodes 101 in the first cluster 100 respectively, at least two data operation requests for a target communication device 300.

In the embodiment of the present application, the cluster system 10 may include a plurality of servers, which may be, for example, a plurality of servers applied in a software defined network (SDN). Of course, the cluster system 10 may also be a cluster composed of a plurality of devices applied in other systems. The cluster system 10 may include a first cluster 100 and a second cluster 200, and each of the clusters may include a plurality of nodes. In a specific implementation, the first cluster 100 may include a plurality of controller nodes (controlling nodes), the second cluster 200 may include a plurality of switch-service nodes (asynchronous processing nodes), and the first cluster 100 can communicate with the second cluster 200. In the embodiment of the present application, the communication device 300 may be a switch or other device, and the number of the communication device 300 may be varied due to different architectures of different systems. The data operation request may be varied according to different communication devices 300 or actual operation requirements. In a specific implementation, the data operation request may be a configuration request for configuring a switch. The data operation request may be a request generated by a client and received by the cluster system 10. After the cluster system 10 processes these data operation requests, corresponding operations are performed on the communication device 300.

In the process of operating the communication device 300, when in a high concurrency state in which a large number of data operation requests occur at the same time, some operations for the communication device 300 need to be performed strictly in the order of the data operation requests. For example, in the process of configuring a switch through the cluster system 10, the configuration needs to be performed in the order of the configuration requests. If the switch is not configured orderly, the final configuration result may not be what the user expected. After the cluster system 10 receives the configuration requests, the configuration requests are queued to be processed sequentially, so as to avoid making them out of order. Conventionally, for example, the configuration requests may be sequentially sent to the switch in the form of extensible markup language xml file. Since sending a configuration request is time-consuming, configuration requests are in a state of queuing to be processed. When in the high concurrency state in which a large number of configuration requests occur in a short period of time, such processing method will greatly reduce the processing capacity and concurrency performance of the system.

In the embodiment of the present application, the cluster system 10 may receive data operation requests through a configuration interface, and different first nodes 101 in the first cluster 100 may receive different data operation requests. These data operation requests may be directed to the same communication device 300. In the embodiment of the present application, the same communication device 300 corresponding to these different data operation requests is referred to as a target communication device. As described above, the data operation requests received by different first nodes 101 may be different configuration requests for the same switch, and the switch is the target communication device.

Step S102: performing competition, between the at least two first nodes 101 that obtain the at least two data operation requests, for a first distributed lock that is preset for the target communication device.

When the first cluster 100 receives at least two data operation requests for the same communication device 300, the communication device 300 is served as the target communication device, and at least two first nodes 101 that respectively receive the data operation requests may compete for the first distributed lock preset for the target communication device.

The distributed lock is a mechanism for controlling the access to shared resources among distributed systems. In a distributed system, actions of different nodes are often coordinated. If different systems or different nodes of the same system share one resource or a group of resources, when accessing these resources, mutual exclusion is often required to prevent interference with each other, so as to ensure that the shared resources accessed by different nodes are consistent. The mechanism of the distributed lock allows the system or node that obtains the distributed lock to access or process the shared resources. The resources that need to be shared may be equipped with a corresponding distributed lock, and the distributed lock is managed by a distributed lock manager. The mechanism of different systems or nodes competing for the distributed lock may be: when it is required to access the shared sources, the different systems or nodes first submit a request for accessing the shared resources to the distributed lock manager; the distributed lock manager then processes the requests from a plurality of systems or nodes, and selects one system or one node from the plurality of systems or nodes as an occupier of the distributed lock which needs to access the shared resources. The system or node that obtains the distributed lock can access the shared resources. During the access, other systems or nodes that fail to obtain the distributed lock have no privilege to access the shared resources.

It can be understood that the mechanism of distributed lock is used in the embodiment of the present application, and a plurality of first nodes 101 compete for the first distributed lock may include: the plurality of first nodes 101 applying for the first distributed lock to the distributed lock manager, and the distributed lock manager determining only one first node 101 that obtains the first distributed lock according to the applications of a plurality of first nodes 101, wherein the first node 101 that obtains the first distributed lock has the privilege to operate storage space 400, and other first nodes 101 that fail to obtain the first distributed have no privilege to operate the storage space 400.

Specifically, in the embodiment of the present application, the data operation request may include identification information of the target communication device, for example, the data operation request may include an IP address, a pre-configured device identifier of the target communication device, and the like. The first nodes 101 may determine a corresponding first distributed lock according to the identification information of the target communication device. Different communication devices 300 correspond to different first distributed locks, and the first distributed lock corresponding to the target communication device can implement mutual exclusion between different first nodes 101, ensuring that only one first node 101 can process the data operation request obtained by this node at the same time. For example, two first nodes 101 in the first cluster 100 respectively receive a configuration request for a switch with an IP address of 10.0.0.3, and then the switch with the IP address of 10.0.0.3 is used as the target communication device. The cluster system 10 configures a first distributed lock for the switch with the IP address of 10.0.0.3 in advance, and the two first nodes 101 may compete for the first distributed lock.

Step S103: storing the obtained data operation request by a first node 101 that obtains the first distributed lock through competition.

When the first node 101 that obtains the first distributed lock though competition processes the data operation request, due to the mutual exclusion nature of the first distributed lock, other first nodes 101 that fail to obtain the first distributed lock through competition cannot process their data operation requests.

In the embodiment of the present application, the first node 101 that obtains the first distributed lock through competition may store the obtained data operation request in the storage space 400. Specifically, data operation requests may be stored in the storage space 400 in a pre-configured manner such as a database, cache, message queue and the like. When a database is used to store data operation requests, the data operation request may be stored in the database in a manner of increasing ID automatically. Optionally, when storing a data operation request, a natural number is used to identify the ID of the data operation request according to the storage order. For example, the ID of the n+1-th data operation request is the ID of the n-th data operation request plus 1. In this way, IDs may represent the storage time order of data operation requests. The smaller the ID, the earlier the storage time, so that a second node 201 that subsequently obtains a second distributed lock through competition acquires a data operation request according to the storage time order of the data operation requests, so as to perform a data operation on the target communication device. Specifically, the second node 201 obtains a data operation request with the smallest ID from the stored data operation requests, that is, a data operation request with the earliest storage time, and then processes it.

A database may store data operation requests corresponding to one target communication device, or may store data operation requests corresponding to different target communication devices. The stored data operation requests are distinguished by different identification information of different target communication devices.

In addition, when using a message queue to store data operation requests, data operation requests for the same target communication device may be stored in the same message queue through a preset algorithm, ensuring that the data operation requests are stored sequentially in time order. The embodiment of the present application does not limit the specific storage format of the data operation requests, but it needs to ensure that the data operation requests are stored sequentially in time order, so as to ensure the sequential storage of the data operation requests and ensure the accurate order of subsequent data operations.

Step S104: performing competition, between the second nodes 201 in the second cluster 200, for a second distributed lock that is preset for the target communication device.

After the first node 101 in the first cluster 100 completes storing the data operation request, the second nodes 201 in the second cluster starts to compete for the second distributed lock.

After the first node 101 in the first cluster 100 completes storing the data operation request by competing for the first distributed lock, the first cluster 100 may instruct the second cluster 200 to perform subsequent steps. For example, the first cluster 100 may instruct the second cluster 200 by sending an RPC (Remote Procedure Call Protocol) message to the second cluster 200. The first node 101 in the first cluster 100 that has completed storing the data operation request may instruct all nodes in the second cluster by sending an RPC message. The notification message may include identification information of the target communication device, and the second nodes 201 in the second cluster 200 may compete for the second distributed lock corresponding to the target communication device. The second distributed lock is also provided for the target communication device in advance, and the second distributed lock also has mutual exclusion nature. When the second node 201 that obtains the second distributed lock though competition processes the data operation request, other second nodes 201 that fail to obtain the second distributed lock through competition cannot process data operation requests.

Step S105: obtaining a data operation request, by a second node 201 that obtains the second distributed lock through competition, from stored data operation requests according to storage time information of the stored data operation requests.

Step S106: performing a data operation on the target communication device by the second node 201 that obtains the second distributed lock through competition.

The second node 201 that obtains the second distributed lock through competition performs the data operation on the target communication device based on the obtained data operation request.

The second cluster 200 may include a plurality of second nodes 201, and the second node 201 that obtains the second distributed lock through competition among the plurality of second nodes 201 may process the data operation request. The procedure of processing may include: obtaining a data operation request with the earliest storage time corresponding to the target communication device from the storage space 400 in which the data operation requests are stored in advance, and performing the data operation on the target communication device according to operation information contained in the data operation request with the earliest storage time. As stated previously, the plurality of first nodes 101 completes the sequential storage of the data operation requests by competing for the first distributed lock. The storage time information of the data operation requests includes the storage time of the data operation requests when being stored sequentially. The second nodes 201 in the second cluster 200 compete for the second distributed lock to extract data operation requests sequentially according to the storage order of the data operation requests, thereby realizing the sequential issue of the data operation requests and ensuring the correct order of data operations. For example, the first nodes 101 store configuration requests for a switch with the IP address of 10.0.0.3 in time order by competing for the first distributed lock. A plurality of second nodes 201 in the second cluster 200 compete for the second distributed lock, so that only one second node 201 can process the stored configuration requests at the same time, and a second node 201 that obtains the second distributed lock through competition may obtain a configuration request with the earliest storage time, and configure the switch with the IP address of 10.0.0.3 according to the configuration request. Through the cooperation between the first cluster 100 and the second cluster 200, sequential processing for the configuration requests is realized, and sequential configuration for the switch is completed.

In the embodiment of the present application, the mechanism of distributed lock is both provided for the processing performed by the first cluster 100 and the second cluster 200. After a first node 101 in the first cluster 100 obtains the first distributed lock through competition, a data operation request is first stored through the storage space 400, so as to ensure the sequential processing for the data operation requests. A plurality of data operation requests for the target communication device may be received by a second node 201 in the second cluster 200. If a plurality of second nodes 201 directly operate data operation requests corresponding to a node that obtains the second distributed lock through competition, the order of the data operation requests is still cannot be ensured. Data operation requests need to be stored in time order through the storage space 400, and the second node 201 that obtains the second distributed lock through competition obtains a data operation request with the earliest storage time from the stored data operation requests according to the time order. In this way, FIFO (First Input First Output) of the stored data operation requests is ensured, and thereby realizing the sequential processing for the data operation requests.

Figure 3:
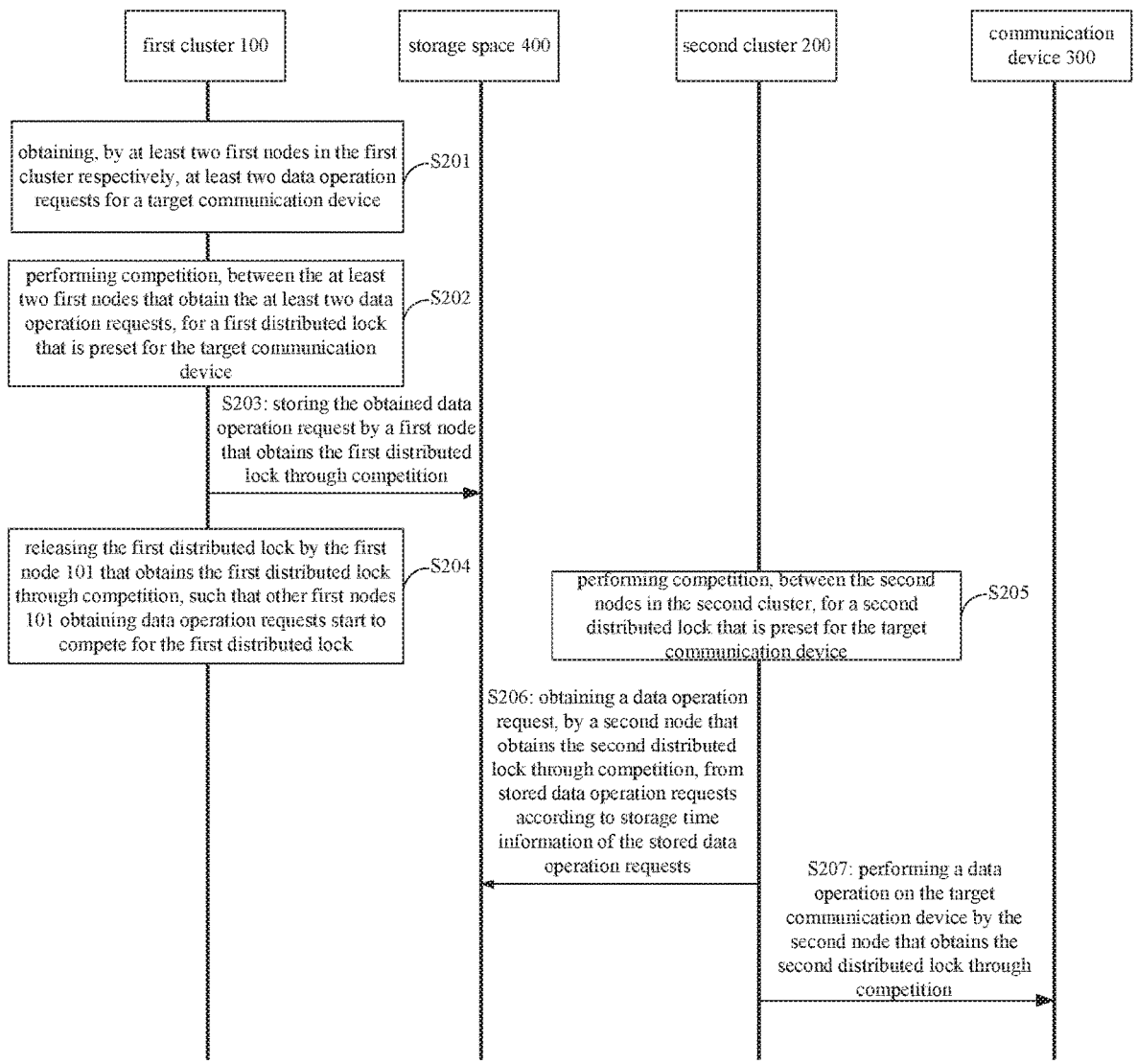
FIG. 3 is a sequence diagram of a method for operating a device according to an embodiment of the present application.

In another specific implementation, after the storage of one data operation request is completed, in order to continue storing other data operation requests, after the first node 101 that obtains the first distributed lock through competition stores the corresponding data operation request, the competition for the first distributed lock may be continued. As shown in FIG. 3, the method may include following steps.

Steps S201 to S203 are the same as steps S101 to S103, which are not repeated here.

Step S204: releasing the first distributed lock by the first node 101 that obtains the first distributed lock through competition, such that other first nodes 101 obtaining data operation requests start to compete for the first distributed lock.

Steps S205 to S207 are the same as steps S104 to S106, which are not repeated here.

The first nodes 101 in the first cluster 100 compete for the first distributed lock to realize sequential storage of the data operation requests. After a first node 101 that obtains the first distributed lock through competition completes the storage of a data operation request, the first distributed lock may be released, so that other first nodes 101 obtaining data operation requests continue competing for the first distributed lock, so as to continue storing other data operation requests. The processing for data operation requests performed by the first cluster 100 and the processing for data operation requests performed by the second cluster 200 may be carried out simultaneously, thereby improving the processing speed of the cluster system 10.

Figure 4:
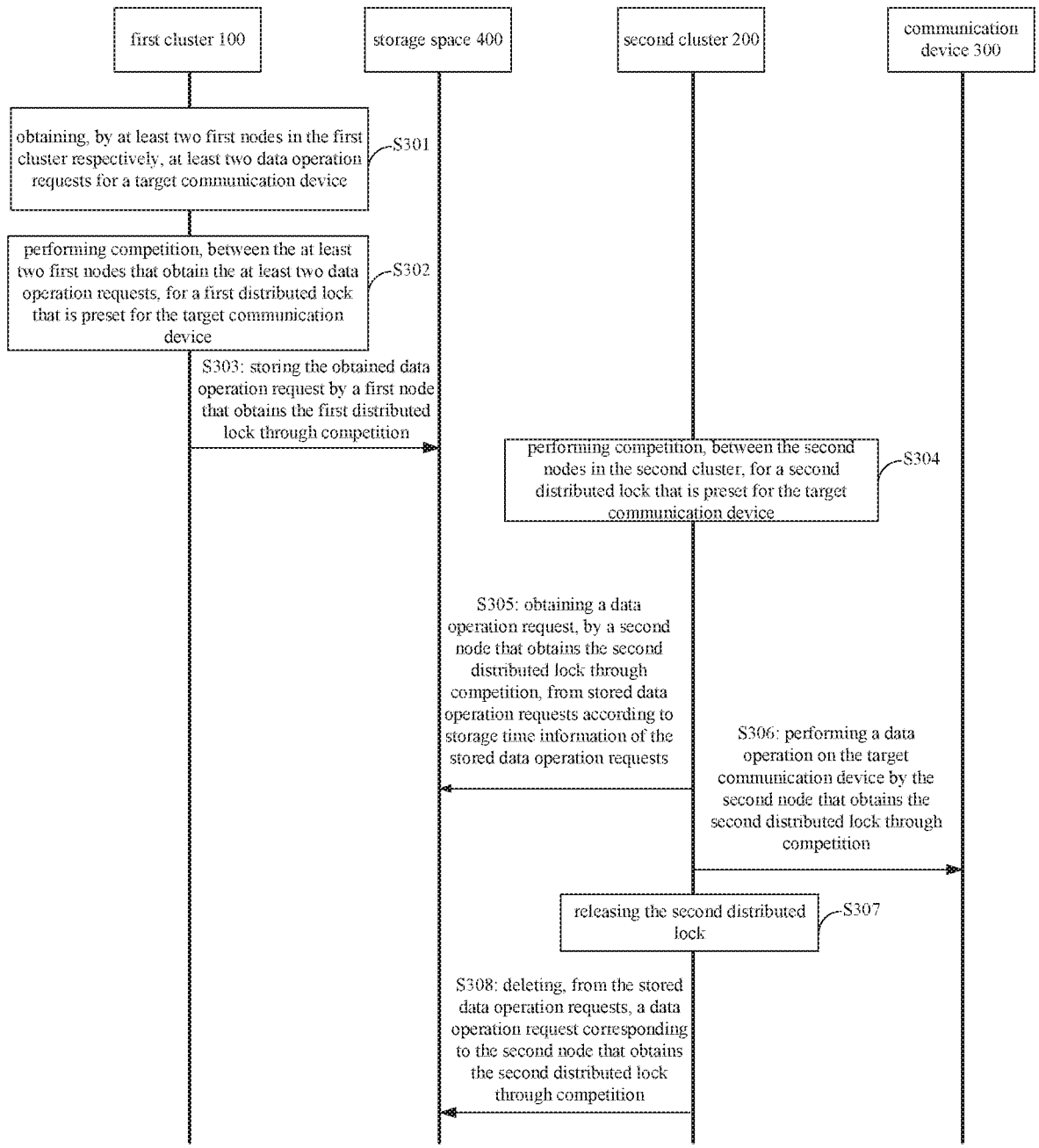
FIG. 4 is a sequence diagram of a method for operating a device according to an embodiment of the present application.

In another specific implementation, in order to continue processing other data operation requests after completing a data operation on the communication device 300, the competition for the second distributed lock may be continued after the second node 201 that obtains the second distributed lock through competition operates the target communication device. Specifically, as shown in FIG. 4, the method may include following steps.

Steps S301 to S306 are the same as steps S101 to S106, which are not repeated here.

Step S307: releasing the second distributed lock by the second node 201 that obtains the second distributed lock through competition.

Step S308: deleting, from the stored data operation requests, a data operation request corresponding to the second node 201 that obtains the second distributed lock through competition.

It can be understood that after a second node 201 that obtains the second distributed lock completes processing a data operation request, it may release the obtained second distributed lock and delete the data operation request that has been processed from the storage space 400. The second nodes 201 in the second cluster 200 may continue competing for the second distributed lock and processing other data operation requests. The timely release of the second distributed lock can ensure that the processing procedure for the data operation requests will not be interrupted. Meanwhile, deleting a completed data operation request from the storage space can prevent other second nodes 201 from subsequently obtaining the data operation request that has been processed, and ensure that the operations for the target communication device would not be performed repeatedly.

In order to prevent a deadlock situation for the first distributed lock, in a specific implementation, the first distributed lock may have a lease, and a first node that obtains the first distributed lock through competition storing the obtained data operation request includes: storing the data operation request within the lease of the first distributed lock; if storage is not completed within the lease of the first distributed lock, releasing the first distributed lock after the lease of the first distributed lock expires.

In order to prevent a deadlock situation for the second distributed lock, in a specific implementation, the second distributed lock has a lease, and a second node that obtains the second distributed lock through competition configures the target communication device after obtaining a data operation request, wherein the configuration specifically includes: performing configuration for the data operation request within the lease of the second distributed lock; if the configuration is not completed within the lease of the second distributed lock, releasing the second distributed lock after the lease of the second distributed lock expires.

Leases are provided for the first distributed lock and the second distributed lock respectively, and the lease duration of the first distributed lock and the second distributed lock may be the same or different, which can prevent the first distributed lock and the second distributed lock from being in the deadlock situation, prevent the system from being unable to continue processing due to possible failures, meanwhile effectively ensuring smooth processing for data operation requests.

The embodiment of the present application provides a method for operating a device, which implements data operations on the communication device 300 through the cooperation between the first cluster 100 and the second cluster 200 in the cluster system 10. The first nodes 101 in the first cluster 100 may compete for the first distributed lock to realize sequential storage of the data operation requests. The second nodes 201 in the second cluster 200 may compete for the second distributed lock to obtain the stored data operation requests sequentially, and complete the data operations on the target communication device. Through the mechanism of two distributed locks, when a high concurrency state in which a large number of data operation requests are received occurs in the cluster system 10, the sequential processing for the large number of data operation requests still can be implemented through the mutual exclusion nature of the first distributed lock and second distributed lock. It can not only ensure the sequential processing for the data operation requests, but also improve the throughput of the first cluster 100, and both the first cluster 100 and the second cluster 200 can be expanded horizontally, which improves availability and processing capacity of the system.

In some embodiments, as shown in FIG. 1, an embodiment of the present application further provides a cluster system 10 including a first cluster 100 and a second cluster 200, wherein the first cluster 100 includes a plurality of first nodes 101, and the second cluster 200 includes a plurality of second nodes 201.

At least two first nodes 101 in the first cluster 100 respectively obtain at least two data operation requests for a target communication device 300.

The at least two first nodes 101 that obtain the at least two data operation requests competing for a first distributed lock preset for the target communication device, and a first node 101 that obtains the first distributed lock through competition stores a corresponding data operation request. Details may be referred to the description of step S101, step S102 and step S103 in the above method embodiment.

The second nodes 201 in the second cluster 200 compete for a second distributed lock preset for the target communication device, and a second node 201 that obtains the second distributed lock through competition obtains a data operation request from stored data operation requests according to storage time information of the stored data operation requests, to perform a data operation on the target communication device. Details may be referred to the description of step S104, step S105 and step S106 in the above method embodiment.

In an implementation, the data operation requests include identification information of the target communication device, and the at least two first nodes 101 that obtain the data operation requests are configured for:

determining a first distributed lock corresponding to the target communication device according to the identification information of the target communication device, and competing for the first distributed lock.

In an implementation, the first node 101 that obtains the first distributed lock through competition is configured for releasing the first distributed lock after storing the obtained data operation request, such that other first nodes 101 obtaining data operation requests start to compete for the first distributed lock. Details may be referred to the description of step S204 in the above method embodiment.

In an implementation, the second node 201 that obtains the second distributed lock through competition is configured for obtaining a data operation request with the earliest storage time from the stored data operation requests.

In an implementation, the second node 201 that obtains the second distributed lock through competition is configured for releasing the second distributed lock after performing the data operation on the target communication device, and deleting the data operation request obtained by the second node 201 that obtains the second distributed lock through competition from the stored data operation requests. Details may be referred to the description of step S307 and step S308 in the above method embodiment.

In an implementation, the first node 101 that obtains the first distributed lock through competition is configured for generating a notification message after storing the corresponding data operation request, and sending the notification message to the second cluster 200 to instruct the second nodes 201 in the second cluster 200 to perform data operations on the target communication device.

In an implementation, the communication device 300 may be a switch, and the data operation request is a configuration request for configuring the switch.

In an implementation, the first node 101 that obtains the first distributed lock through competition is configured for storing the data operation request in a manner of increasing ID automatically. Details may be referred to the description of step S103.

Correspondingly, the second node 201 that obtains the second distributed lock through competition is configured for obtaining a data operation request with the smallest ID from the stored data operation requests. Details may be referred to the description of step S105.

An embodiment of the present application further provides a readable storage medium, which stores instructions. When the instructions are executed on a computer, the computer is served as the above first node 101 and/or the second node 201 to carry out the above method for operating a device.

An embodiment of the present application further provides a readable storage medium, which stores at least one of first instructions and second instructions. When the first instructions are executed on a computer, the computer carries out steps performed by the first node 101 in the above method for operating a device. When the second instructions are executed on a computer, the computer carries out steps performed by the second node 201 in the above method for operating a device.

An embodiment of the present application further provides an electronic device, which includes a memory and a processor, wherein the memory stores at least one of first executable program code and second executable program code, and the processor reads the first executable program code stored in the memory to carry out steps performed by the first node in the above method for operating a device, and the processor reads the second executable program code stored in the memory to carry out steps performed by the second node in the above method for operating a device.

Figure 5:
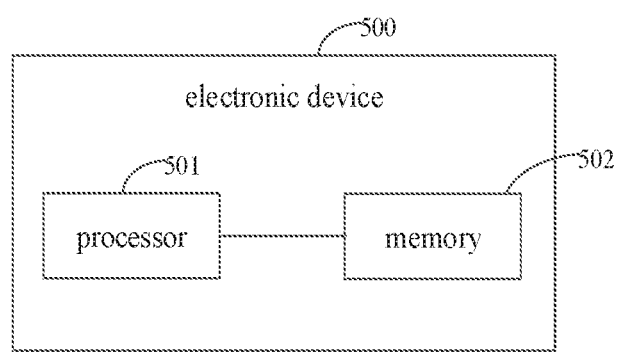
FIG. 5 is a schematic structural diagram of an electronic device according to an embodiment of the present application.

Referring to FIG. 5, FIG. 5 is a schematic diagram of an electronic device 500 according to an embodiment of the present application. The electronic device 500 may be the first node 101 or the second node 201 in the above cluster system 10. In the embodiment of the present application, the electronic device 500 may include a processor 501 and a memory 502. The memory 502 may be used to store executable program code, and the processor 501 is used to read the executable program code stored in the memory 502. When the executable program code is executed by the processor 501, the electronic device 500 can be served as the first node 101 and/or the second node 201 to carry out the above method for operating a device.

If the electronic device 500 has functions implemented in the form of software functional modules and sold or used as an independent product, it can be stored in a computer-readable storage medium. Based on this understanding, the technical solution of the present application may be essentially, or a part that contributes to the prior art or a part of this technical solution may be embodied in the form of a software product. This computer software product is stored in a storage medium, including several instructions for causing the processor 501 in the electronic device 500 to perform all or part of steps of the methods according to the embodiments of the present application. The above storage medium may include: a U disk, a mobile hard disk, a read-only memory (ROM), a random access memory (RAM), a magnetic disk or an optical disk and various mediums that can store program code.

The embodiments of the present application provide a method, a cluster system, an electronic device for operating a device and a readable storage medium, wherein the cooperation between the first cluster and the second cluster in the cluster system implements data operations on the communication device. The first nodes in the first cluster may compete for the first distributed lock to realize sequential storage of the data operation requests. The second nodes in the second cluster may compete for the second distributed lock to obtain the stored data operation requests sequentially, and complete the data operations on the target communication device. Through the mechanism of two distributed locks, when a high concurrency state in which a large number of data operation requests are received occurs in the cluster system, the sequential processing for the large number of data operation requests still can be implemented through the mutual exclusion nature of the first distributed lock and second distributed lock. It can not only ensure the sequential processing for the data operation requests, but also improve the throughput of the first cluster, and both the first cluster and the second cluster can be expanded horizontally, which improves availability and processing capacity of the system.

According to several embodiments provided by the present application, it should be understood that the disclosed apparatus and method may also be implemented in other ways. The apparatus embodiments described above are only schematic. For example, the flowcharts and block diagrams in the accompanying drawings show possible architectures, functions, and operations of the apparatuses, methods, and computer program products according to various embodiments of the present application. In this regard, each block in a flowchart or block diagram may represent a module, a program segment, or a part of the code, which contains one or more executable instructions for implementing a specified logical function. It should also be noted that in some alternative implementations, a function marked in a block may also be implemented in a different order than that marked in a drawing. For example, two consecutive blocks may actually be performed substantially in parallel, and they may sometimes be performed in a reverse order, depending on the function involved. It should also be noted that each block in the block diagrams and/or flowcharts, and combinations of blocks in the block diagrams and/or flowcharts, can be implemented with a dedicated hardware-based system that performs specified functions or actions, or can be implemented with a combination of dedicated hardware and computer instructions.

In addition, functional modules in various embodiments of the present application may be integrated together to form an independent part, or each module may exist independently, or two or more modules may be integrated to form an independent part.

The above are only preferred embodiments of the present application, which are not intended to limit the present application. For those skilled in the art, various modifications and changes can be made to the present application. Any modifications, alternatives, improvements, or the like within the spirit and principle of the present application shall be included within the protection scope of the present application. It should be noted that similar reference signs and letters indicate similar items in the drawings, thus once an item is defined in one drawing, this item is not required to be further defined and explained in subsequent drawings.

The above are only specific implementations of the present application, and the protection scope of the present application is not limited to this. Within the technical scope disclosed by the present application, any changes or alternatives made by a person skilled in the art easily are within the protection scope of the present application. Therefore, the protection scope of the present application shall be defined by the claims.

INDUSTRIAL APPLICABILITY

The present application provides a method, a cluster system, an electronic device for operating a device and a readable storage medium, for adaptive mode selection. It can not only ensure the sequential processing for the data operation requests, but also improve the throughput of the first cluster, and both the first cluster and the second cluster can be expanded horizontally, which improves availability and processing capacity of the system.

What is claimed is:

1. A method for operating a device, which is applicable to a cluster system, wherein the cluster system comprises a first cluster and a second cluster, the first cluster comprises a plurality of first nodes, the second cluster comprises a plurality of second nodes, and the method comprises:

obtaining, by at least two first nodes in the first cluster respectively, at least two data operation requests for a target communication device;

performing competition, between the at least two first nodes, for a first distributed lock that is preset for the target communication device;

storing the obtained data operation request by a first node that obtains the first distributed lock through competition;

performing competition, between the second nodes in the second cluster, for a second distributed lock preset for the target communication device;

obtaining, by a second node that obtains the second distributed lock through competition, a data operation request from stored data operation requests according to storage time information of the stored data operation requests, so as to perform a data operation on the target communication device.

2. The method for operating a device of claim 1, wherein, the data operation requests comprise identification information of the target communication device;

performing competition, between the at least two first nodes, for a first distributed lock preset for the target communication device comprises:

determining, by the at least two first nodes, a first distributed lock corresponding to the target communication device according to the identification information of the target communication device, and performing competition for the first distributed lock.

3. The method for operating a device of claim 1, wherein the method further comprises:
releasing the first distributed lock by the first node that obtains the first distributed lock through competition, such that other first nodes obtaining data operation requests start to compete for the first distributed lock.

4. The method for operating a device of claim 1, wherein obtaining, by a second node that obtains the second distributed lock through competition, a data operation request from stored data operation requests according to storage time information of the stored data operation requests comprises:
obtaining, by the second node that obtains the second distributed lock through competition, a data operation request with the earliest storage time from the stored data operation requests.

5. The method for operating a device of claim 1, wherein the method further comprises:
releasing, by the second node that obtains the second distributed lock through competition, the second distributed lock, and deleting, from the stored data operation requests, the data operation request obtained by the second node that obtains the second distributed lock through competition.

6. The method for operating a device of claim 1, wherein the method further comprises:
generating and sending, by the first node that obtains the first distributed lock through competition, a notification message to the second cluster to instruct the second nodes in the second cluster to perform data operations on the target communication device.

7. The method for operating a device of claim 1, wherein the target communication device is a switch, and the data operation request is a configuration request for configuring the switch.

8. The method for operating a device of claim 1, wherein storing the obtained data operation request by a first node that obtains the first distributed lock through competition comprises:
storing the data operation request in a manner of increasing ID automatically;
wherein obtaining, by a second node that obtains the second distributed lock through competition, a data operation request from stored data operation requests according to storage time information of the stored data operation requests comprises:
obtaining a data operation request with the smallest ID from the stored data operation requests.

9. A cluster system, comprising a first cluster and a second cluster, the first cluster comprising a plurality of first nodes, and the second cluster comprising a plurality of second nodes, wherein,
at least two first nodes in the first cluster respectively obtain at least two data operation requests for a target communication device;
the at least two first nodes compete for a first distributed lock that is preset for the target communication device;
a first node that obtains the first distributed lock through competition stores the obtained data operation request;
the second nodes in the second cluster compete for a second distributed lock that is preset for the target communication device;
a second node that obtains the second distributed lock through competition obtains a data operation request from stored data operation requests according to storage time information of the stored data operation requests, so as to perform a data operation on the target communication device.

10. The cluster system of claim 9, wherein the data operation requests comprise identification information of the target communication device;
the at least two first nodes are configured for:
determining a first distributed lock corresponding to the target communication device according to the identification information of the target communication device, and competing for the first distributed lock.

11. The cluster system of claim 9, wherein,
the first node that obtains the first distributed lock through competition is configured for releasing the first distributed lock after storing the obtained data operation request, such that other first nodes obtaining data operation requests start to compete for the first distributed lock.

12. The cluster system of claim 9, wherein the second node that obtains the second distributed lock through competition is configured for:
obtaining a data operation request with the earliest storage time from the stored data operation requests.

13. The cluster system of claim 9, wherein the second node that obtains the second distributed lock through competition is configured for releasing the second distributed lock, and deleting, from the stored data operation requests, the data operation request obtained by the second node that obtains the second distributed lock through competition.

14. The cluster system of claim 9, wherein the first node that obtains the first distributed lock through competition is configured for generating and sending a notification message to the second cluster to instruct the second nodes in the second cluster to perform data operations on the target communication device.

15. The cluster system of claim 9, wherein the target communication device is a switch, and the data operation request is a configuration request for configuring the switch.

16. The cluster system of claim 9, wherein the first node that obtains the first distributed lock through competition is configured for:
storing the data operation request in a manner of increasing ID automatically;
wherein the second node that obtains the second distributed lock through competition is configured for:
obtaining a data operation request with the smallest ID from the stored data operation requests.

17. A non-transitory computer readable storage medium, wherein the readable storage medium stores first instructions, when the first instructions are executed on a computer, the computer carries out steps performed by the first node in the method of claim 1, and, the readable storage medium stores second instructions, when the second instructions are executed on a computer, the computer carries out steps performed by the second node in the method of claim 1.

18. An electronic device, comprising a memory and a processor, wherein,
the memory is configured for storing first executable program codes, and the processor is configured for reading the first executable program codes stored in the memory to carry out steps performed by the first node in the method of claim 1, and the memory is configured for storing second executable program codes, and the processor is configured for reading the second executable program codes stored in the memory to carry out steps performed by the second node in the method of claim 1.

19. The method for operating a device of claim 2, wherein, the identification information comprises an IP address or a pre-configured device identifier of the target communication device.

20. The cluster system of claim 10, wherein, the identification information comprises an IP address or a pre-configured device identifier of the target communication device.

* * * * *